United States Patent [19]
Whitchurch

[11] 3,955,831
[45] May 11, 1976

[54] COMPOUND TRAILER HITCH WITH GOOSENECK SUPPORT

[76] Inventor: Woodrow C. Whitchurch, Paonia, Colo. 81428

[22] Filed: Apr. 14, 1975

[21] Appl. No.: 567,860

Related U.S. Application Data

[63] Continuation-in-part of Ser. No. 449,023, March 7, 1974, abandoned.

[52] U.S. Cl. .................... 280/423 R; 280/446 R; 280/456 R
[51] Int. Cl.² .................................. B62D 53/00
[58] Field of Search .............. 446 R; 450 R; 423 R

[56] References Cited
UNITED STATES PATENTS

| | | | |
|---|---|---|---|
| 2,444,944 | 7/1948 | Minter | 280/456 R |
| 3,722,917 | 3/1973 | Mims | 280/423 R |
| 3,787,068 | 1/1974 | Miller | 280/446 R |
| 3,790,191 | 2/1974 | Gallatin | 280/456 R |
| 3,810,661 | 5/1974 | Lowrance | 280/423 R |

Primary Examiner—Robert R. Song
Attorney, Agent, or Firm—Van Valkenburgh, Lowe & Law

[57] ABSTRACT

A compound trailer hitch which includes a pair of links pivotally interconnecting a pickup truck and a two-wheel type trailer. The links converge symmetrically from spaced apart positions at the leading end of the trailer to the trailing end of the truck. This convergence is such that the forward projectons of the links converge to define a pivot axis which is at the longitudinal axis of the truck and near the rear axle thereof whenever the truck and trailer are in alignment.

The front portion of the weight of the trailer and the load upon it is supported upon the truck by an arm similar to a gooseneck hitch. This arm is pivoted at each end, at the truck and at the trailer, and it also slides in a groove at the truck connection to compensate for the drifting of the pivot axis defined by links which occurs whenever the trailer swings to an angle with respect to the truck, as in a turn.

11 Claims, 16 Drawing Figures

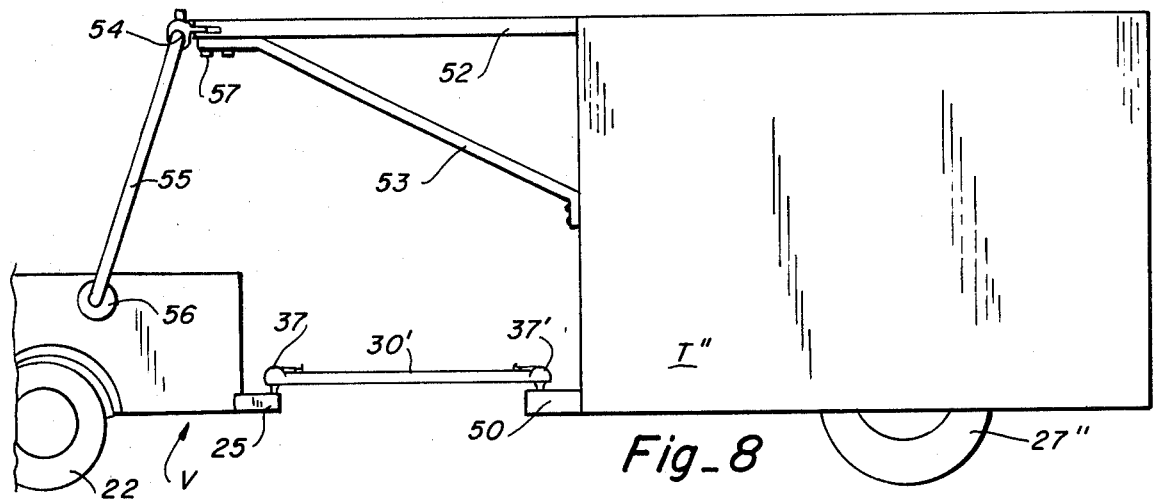
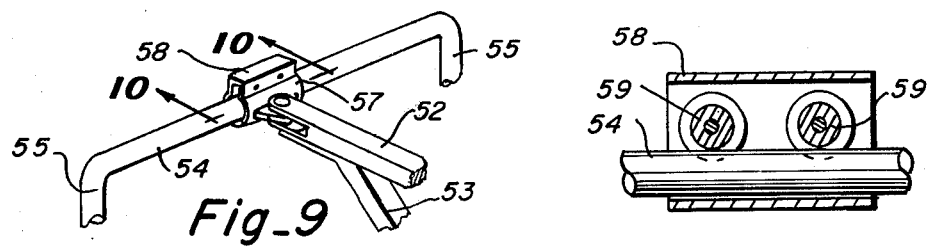
Fig_10
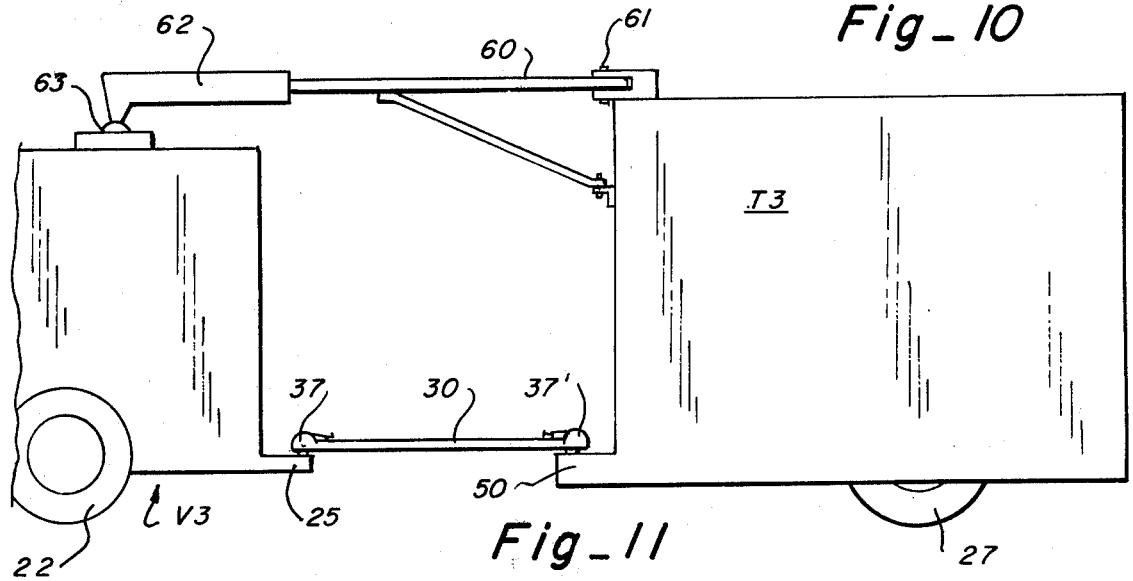
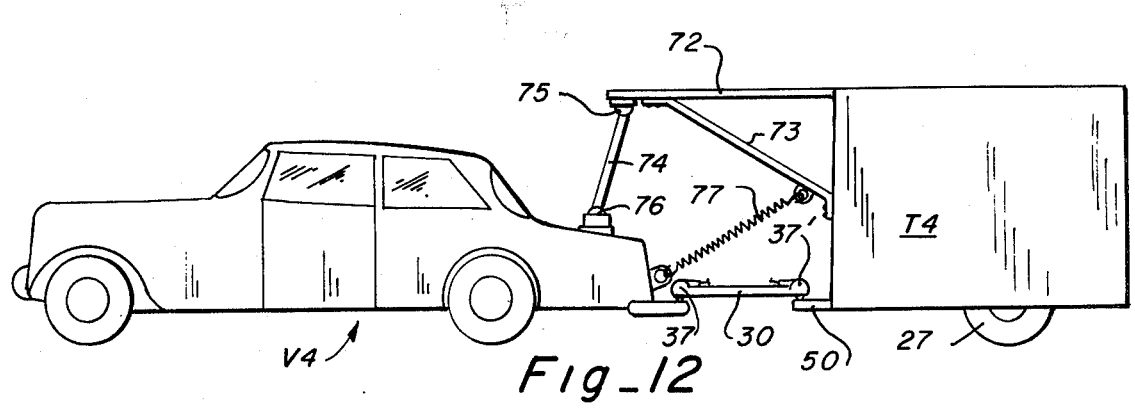

COMPOUND TRAILER HITCH WITH GOOSENECK SUPPORT

This application is a continuation-in-part of my application for a COMPOUND TRAILER HITCH, Ser. No. 449,023, filed Mar. 7, 1974, now abandoned to claim subject matter heretofore cancelled from that application responsive to a requirement for division and also to disclose and claim new related subject matter.

The present invention relates to trailer hitches, and more particularly to trailer hitches for two-wheel trailers which extend forwardly from the leading end of the trailer to connect with the trailing end of a vehicle such as an automobile or truck. In the present invention, the trailer hitch includes a pair of links which pivotally connect with both the truck and trailer to function in a complementary manner. Also, a pivoted arm, cantilevered from the trailer and mounted upon the truck bed, is used to support the front portion of the trailer upon the towing vehicle. The arm is similar to the arm of a gooseneck hitch; thus, as such, the invention will be called a "Compound Trailer Hitch with Gooseneck Support."

In contrast with the present invention, a simple, common type of trailer hitch consists of a rigid tongue centered along the longitudinal axis of the trailer and cantilevered forwardly from the trailer to a pivot connection at the rear end of a vehicle, hereinafter referred to as a truck. This pivot connection, a pin or a ball, secures the tongue to the truck but provides a lateral swinging freedom of movement between the truck and the trailer when the truck is turning.

This conventional trailer hitch has several disadvantages. In the first place, a trailer will often sway from one side to the other while it is being towed, as by a truck, and occasionally this swaying can be severe and extremely hazardous. Also, the trailer will not always properly follow when the truck is turning. Also, a truck and a trailer are very difficult to steer during backing operations. The disadvantages above noted reside primarily in the fact that the tongue of the trailer is connected to the rear end of the truck, usually adjacent to the rear bumper and this connection is several feet behind the rear wheels of the truck. Thus, whenever the vehicle commences to turn in one direction, the first movement at the rear end of the truck is in the opposite direction because, in a relative sense, the vehicle will pivot at its rear axle. This produces, first, a lateral movement away from the turn, and such a movement may be magnified when transmitted to the tongue of the trailer. Swaying of the trailer can thus occur when a truck is driving down a road where the operator has to make minor steering corrections. Each time the operator makes a slight turn to the right or left, the first response by the trailer will be a slight turn in the opposite direction. The trailer will then swing back and overcompensate such movement to produce the resulting side sway in a trailer. The same type of overcompensation occurs when the trailer is being backed up and the operator must learn to control steering movements in the truck which are the opposite from that which would appear to be normal to him.

In commercial tractor-trailer rigs, this problem is obviated by the use of a fifth wheel at the front end of the trailer. This fifth wheel, the pivot connection, is over the rear wheel assembly of the tractor so that the turning of the tractor does not create any significant lateral movement of the trailer. The advantage of such an arrangement has been recognized in small trailers which are towed by pickup trucks, because the trailers for pickup trucks are now being provided with gooseneck connections, a forwardly extended arm which carries an overhanging, forwardly extended connection to produce an equivalent to the fifth wheel. This gooseneck connection will connect with a base pad in the bed of the pickup truck directly over the rear axle. The same comparable result is attempted for connecting a trailer to automobiles by using a special tongue connector which extends underneath the rear of the automobile to the rear axle where it is pivoted.

However, the conventional gooseneck connectors are not entirely satisfactory. They do transfer a portion of the load on a trailer directly over the drive wheels of a truck which is desirable, but whenever the truck is pulling a load, the connector on the deck of the pickup truck creates an undesirable torque action tending to lift the steering wheels of the truck. A better location for connecting a trailer is at the bumper section of the vehicle which is at wheel level and more nearly in alignment with the pulling action by the truck. Accordingly, there is a need for an improved mode of connecting a trailer to a pickup truck or an automobile which will avoid the disadvantages above noted.

The present invention was conceived and developed with the foregoing considerations in view and comprises, in essence, a compound trailer hitch which includes a pair of links extended between a truck and a trailer. The links are swivel connected to both the truck and trailer. They converge from spaced-apart positions at the leading edge of the trailer to connect with the truck at closer positions, in a symmetrical manner such that the projections of the links converge to provide pivot action at a point at the rear axle of the vehicle. This desired location of the pivot point produces a balanced smooth turn. In providing such an arrangement, it becomes necessary to transfer a portion of the trailer load to the truck and it has been found that a load transferring device in the general arrangement of a gooseneck type of arm pivotally connected to both the truck and trailer is best for the purpose.

It follows that an object of the invention is to provide a novel and improved compound trailer hitch supplemented by a gooseneck type support arm which will effectively eliminate side sway when a trailer is being towed by a truck.

Another object of the invention is to provide a novel and improved compound trailer hitch which will permit a trailer to easily turn when it is being towed by a pickup truck and to turn on a radius essentially the same or slightly less than the radius at which the truck turns.

Another object of the invention is to provide a novel and improved compound trailer hitch which makes backing-up operations of a truck and trailer attached thereto, an easy, accurate job without the necessity of several false starts.

Other objects of the invention are to provide a novel and improved compound trailer hitch which uses conventional trailer hitch components and which is simple, economical, reliable, rugged and durable.

With the foregoing and other objects in view, my present invention comprises certain constructions, combinations and arrangements of parts and elements as hereinafter described, defined in the appended claims and illustrated in preferred embodiment by the accompanying drawings in which:

Figure 5:
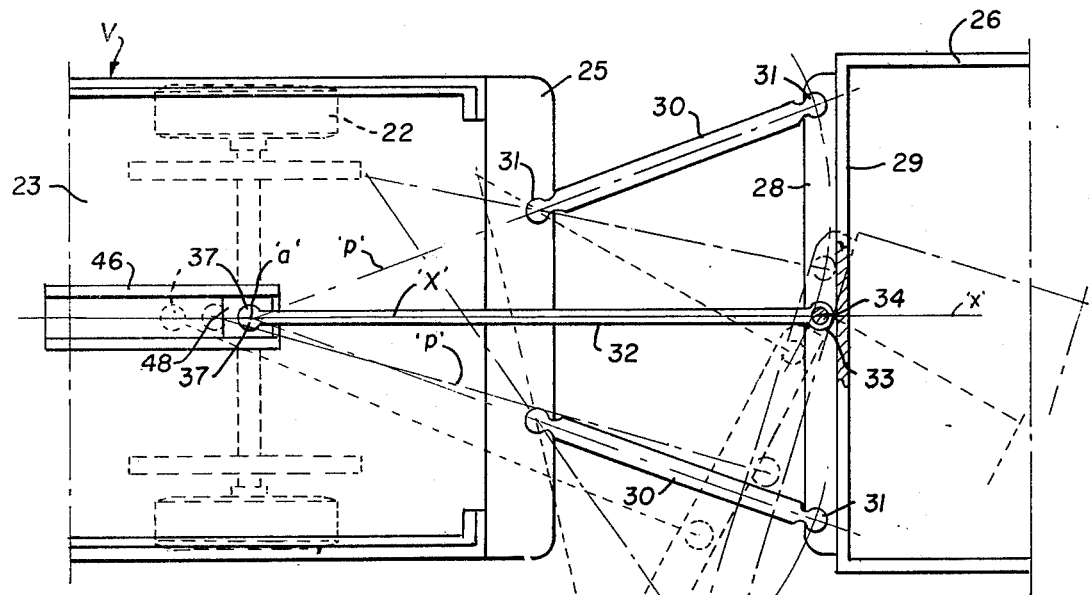

FIG. 5 is a diagrammatic plan view of the rear portion of the truck and of the front portion of the trailer, with the wheels and axle of the truck being shown in broken lines and with the truck and trailer connected by the improved hitch combination; the figure also shows center line projections of the hitch links which meet at the center of the rear axle assembly when the trailer is directly behind the truck. The figure also shows, in dashed line center lines of the hitch links when the trailer turned at an angle of approximately 22°, and in dotted line center lines of the hitch links when the trailer turned at an angle of approximately 45°.

Figure 6:
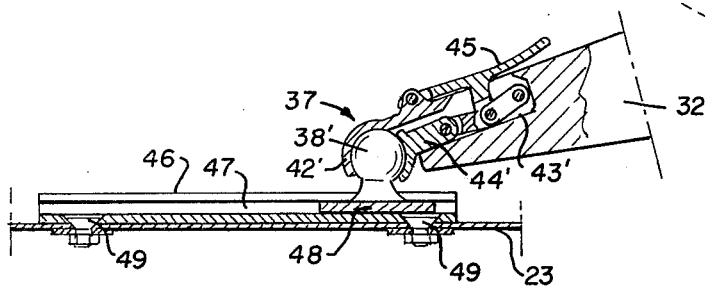

FIG. 6 is a fragmentary sectional detail as taken from the indicated line 6—6 at FIG. 5 but on an enlarged scale.

Figure 7:
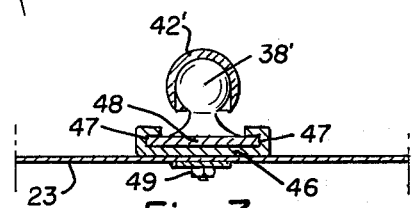

FIG. 7 is a fragmentary sectional detail taken from the indicated line 7—7 at FIG. 6.

FIG. 8 is a side elevational view of the rear portion of a truck and of a trailer, similar to FIG. 6, but with an arm extending forwardly from the trailer to connect with a rocker on the truck for transmitting a part of the trailer load to the truck;

FIG. 9 is a fragmentary isometric view of portions of the arm and rocker shown at FIG. 8;

FIG. 10 is a fragmentary sectional detail as taken from the indicated line 10—10 at FIG. 9, but on an enlarged scale;

FIG. 11 is a side elevational view of the rear portion of a truck and of a trailer, similar to FIG. 8, but with a swingable restraining arm extending forwardly from the trailer to connect with a swivelled sleeve mounted upon the truck for transmitting a part of the trailer load to the truck.

FIG. 12 is a side elevational view of an automobile and of a trailer, similar to FIG. 8, but with an arm extending forwardly from the trailer to connect with a swivelled strut upstanding from the back of the automobile.

Figure 13:
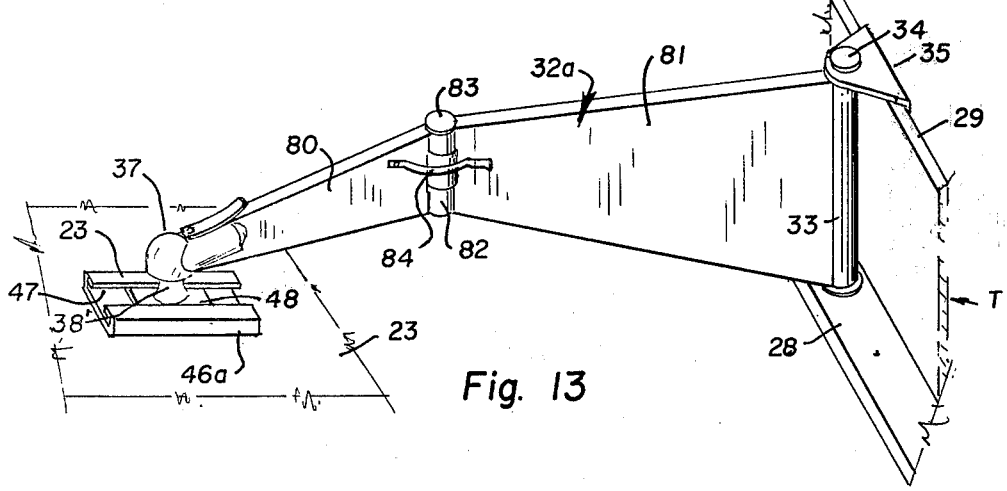

FIG. 13 is a perspective view of a modified form of a gooseneck trailer hitch which is articulated by providing a pivot in the gooseneck arm.

Figure 1:
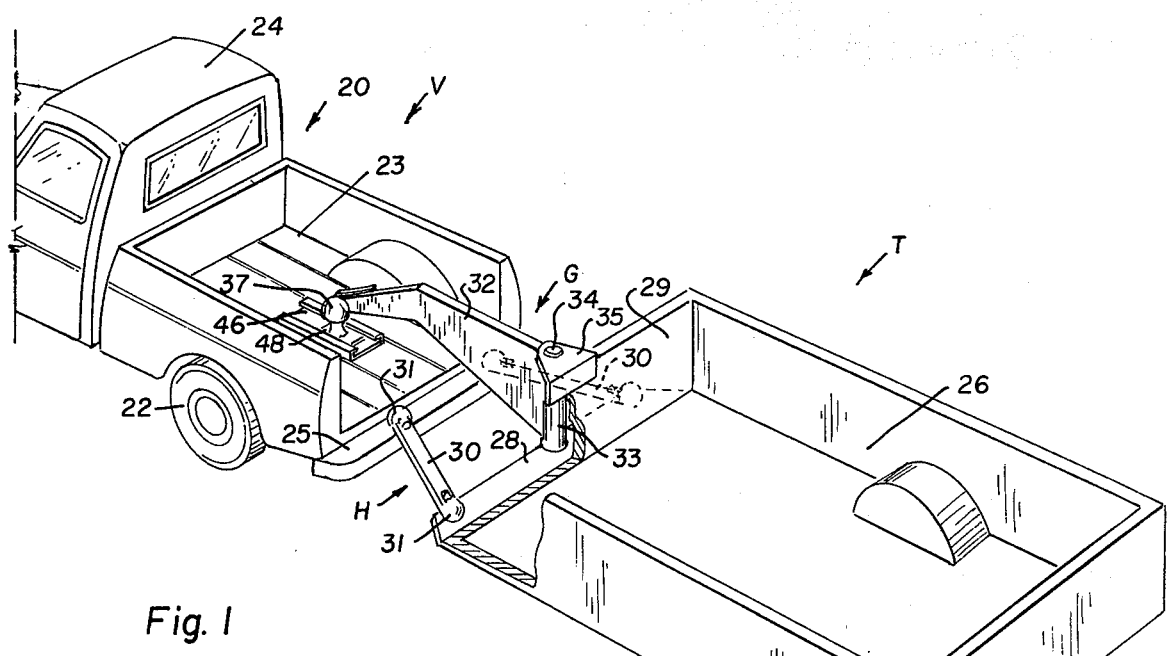
FIG. 1 is a perspective view of a pickup truck and a trailer connected thereto by a compound trailer hitch and gooseneck supporting member according to the present invention.
Figure 3:
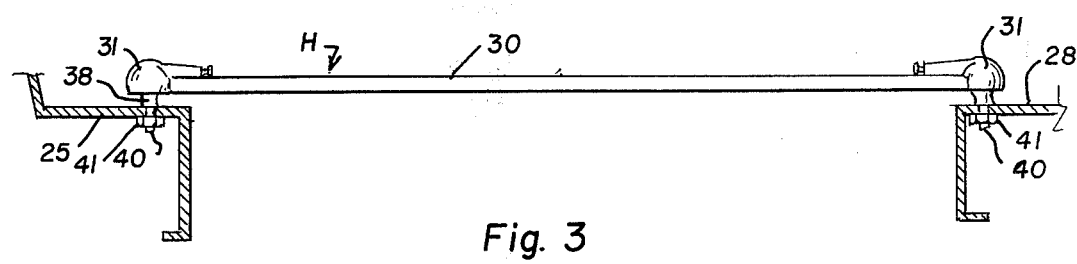
FIG. 3 is a side elevational view of a hitch link attaching the trailer to the truck, as taken from the indicated line 3—3 at FIG. 1, but on an enlarged scale.
Figure 14:
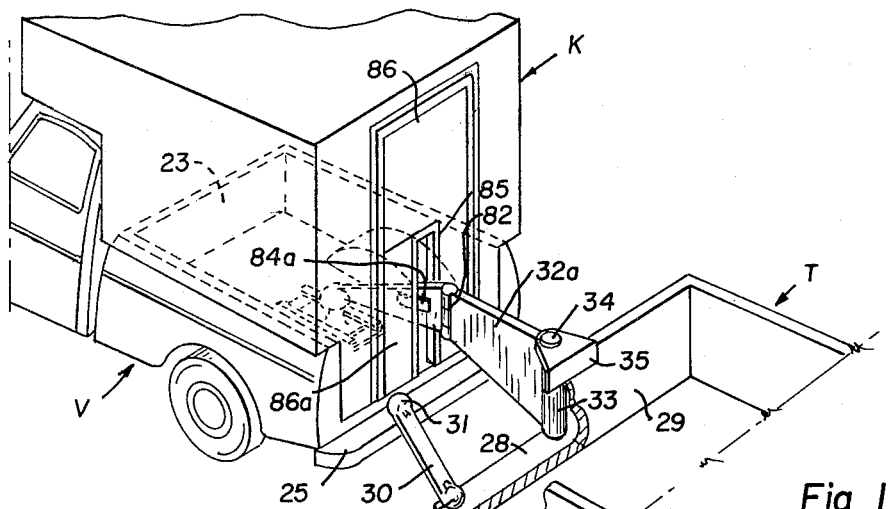

FIG. 14 is a perspective view similar to FIG. 1, but showing a pickup truck having a camper mounted over the truck bed and a trailer connected thereto by a compound trailer hitch and an articulated gooseneck supporting member such as illustrated at FIG. 3.

Figure 2:
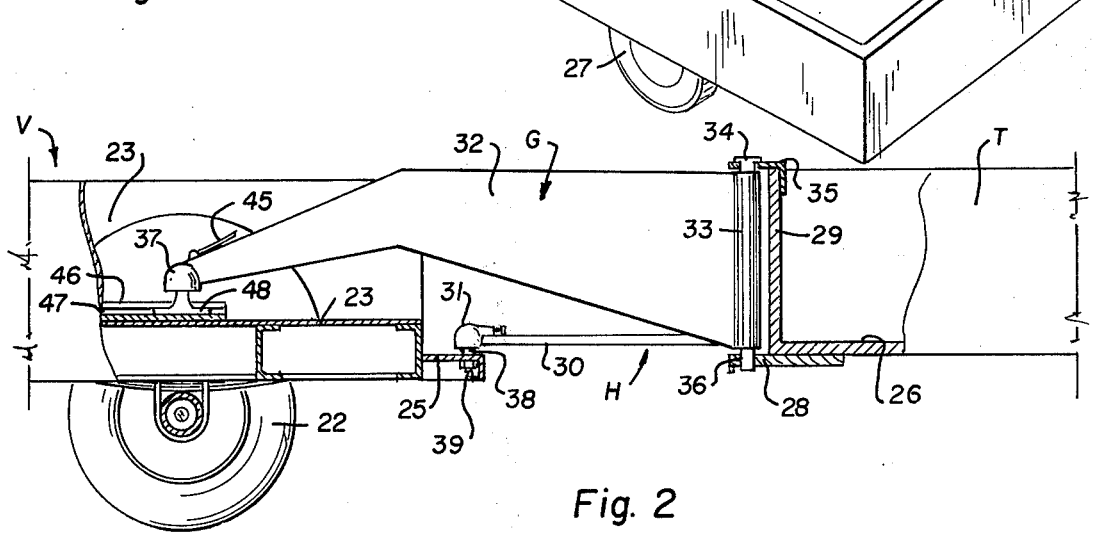
FIG. 2 is a side elevational view of the rear portion of the truck and the front portion of the trailer with portions of the truck and trailer broken away and in section to show parts otherwise hidden from view.
Figure 15:
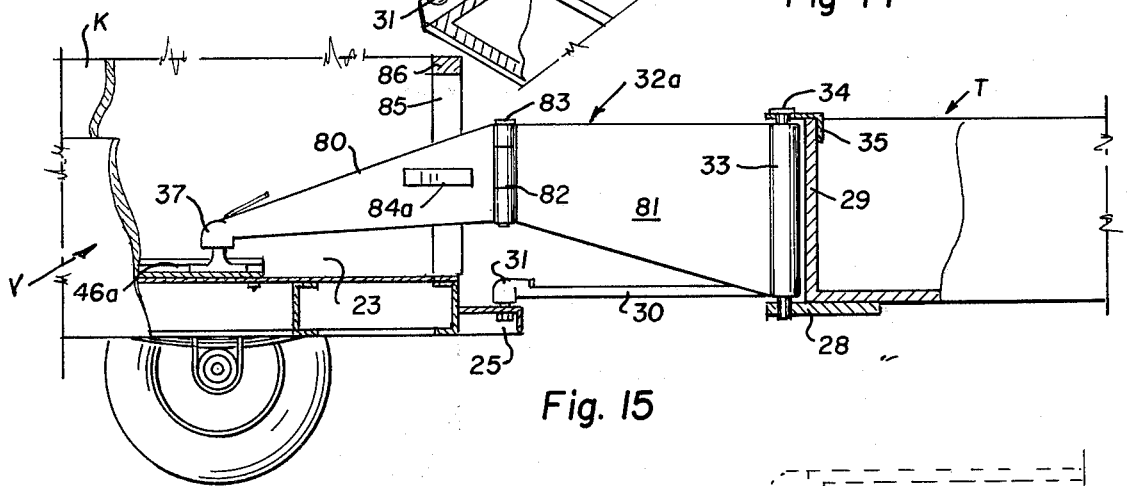

FIG. 15 is a side elevational view similar to FIG. 2, but showing the rear portion of the truck, a fragment of the camper mounted thereon and the front portion of the trailer, with portions of the truck and trailer broken away and in section to show parts otherwise hidden from view.

Figure 16:
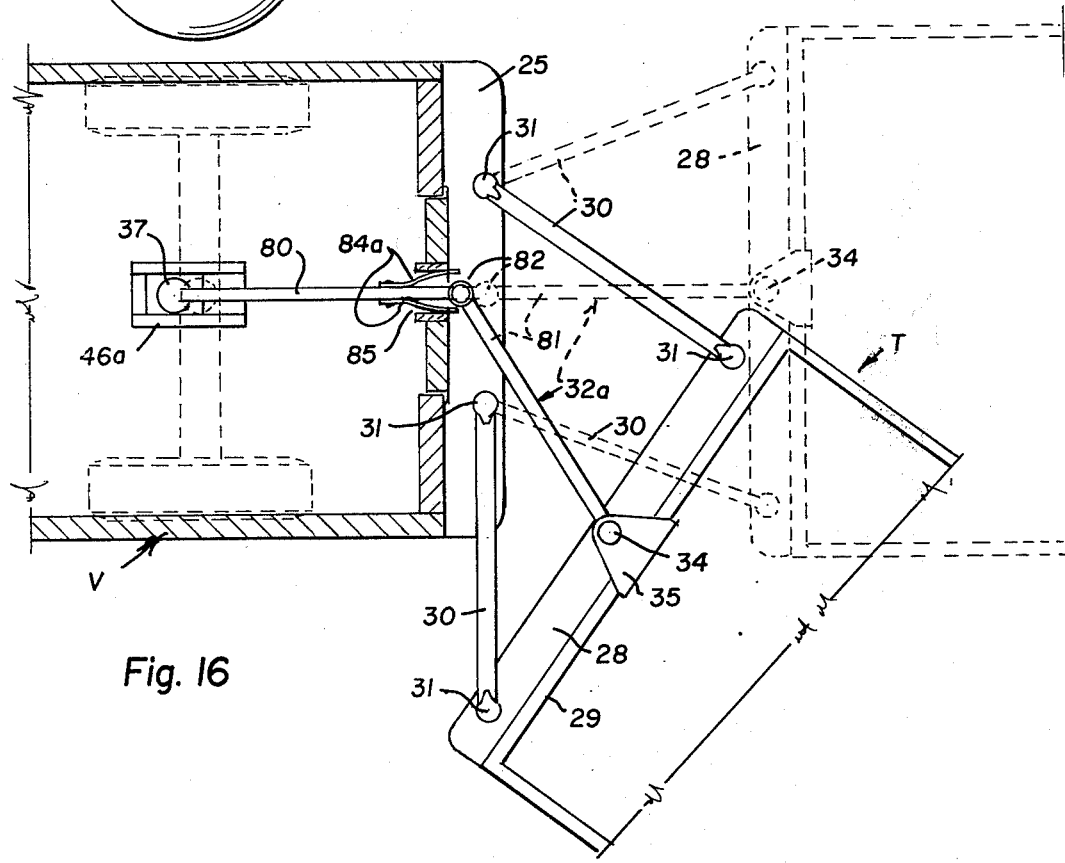

FIG. 16 is a diagrammatic plan view, similar to FIG. 5, showing the rear portion of the truck and the front portion of the trailer illustrated at FIG. 14, but with the trailer being positioned as when the truck is turning sharply and showing further, in broken lines, the position of the trailer when it is aligned with the truck.

Referring more particularly to the drawing, FIGS. 1 to 5 illustrate one embodiment of the invention showing a truck V and a trailer T connected with the compound trailer hitch H and a gooseneck support arm G. The truck V is representative of any one of a number of different types of vehicles capable of towing a trailer by a hitch connected to the rear bumper of the vehicle. The trailer T is shown as a two-wheeled unit and is representative of any one of a number of different types of two-wheel trailers which can use the improved compound trailer H and the gooseneck support arm G.

In a two-wheeled trailer of the type shown, or in four-wheeled trailers where the wheels are set closely together, the weight of the trailer and its load cannot be balanced upon the wheels; thus, a portion of the weight of the trailer and the load upon it is carried by the truck. The improved compound trailer hitch H will permit the truck to pull the trailer while the gooseneck support arm G transmits the trailer weight to the truck and, but not necessarily, preferably to a point directly over the rear axle thereof, as in the manner best shown at FIG. 1. Other equivalent arrangements may also be provided for supporting this portion of the trailer weight depending upon the type of vehicle used, such as shown at FIGS. 8, 11 and 12 and hereinafter further described.

The truck V will have a body 20 which is supported upon front wheels, not shown, and rear wheels 22. A standard cargo bed 23 is located behind the cab 24 of the truck and box-type rear bumper 25 projects from behind the bed 23. The compound trailer hitch H will connect to this rear bumper 25, but whenever the compound trailer hitch H is used with another type of a vehicle which does not have such a bumper, it will be connected to the rear of the vehicle, to the bumper or otherwise, much in the same manner as a conventional trailer hitch would be connected.

The trailer T includes a longitudinally extended box-type body 26 supported upon a pair of wheels 27 which are carried upon an axle, or axles, not shown. The wheels are located at a position which is rearwardly of the center of gravity of the trailer body so as to permit the truck to carry a portion of the trailer weight through the gooseneck support arm G as heretofore mentioned. The trailer will include a shelf 28 for its leading edge for holding the hitch H and the front wall 29 of the body 26 is suitably reinforced to hold the gooseneck support arm G as hereinafter described.

The improved connector hitch H is formed as a pair of spaced-apart links 30 which extend from the shelf 28 at the leading end of the trailer T to the bumper 25 of the truck V. Each link 30 is connected to the trailer shelf 28 and to the bumper 25 by a swivelled pivot such as a ball and socket joint 31. This permits these links 30 to swing in horizontal and vertical directions responsive to turning of the truck and changes in the grade of the road over which the vehicle and the trailer will move. The gooseneck support G is formed by a cantilevered arm 32. The rear end of this arm carries an upright tubular bearing 33 connected to a vertically axised pivot 34 adjacent to the wall 29 of the trailer. The top of the pivot 34 is secured to a bracket 35 which is attached to and outstands from the top of the front wall 29 and its bottom is fitted into a socket 36 at the shelf 28 as shown at FIG. 2. The extended end of the arm 32 is formed as a ball and socket connector 37 which fits into a slidable mount 38 attached to the floor of the truck bed 23 as hereinafter described.

Figure 4:
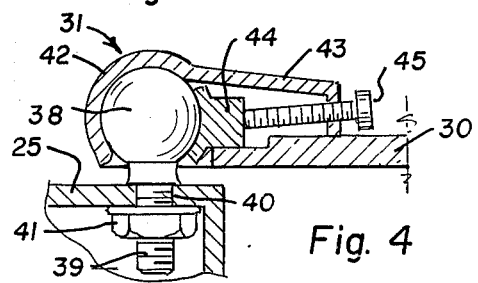
FIG. 4 is a fragmentary sectional detail view of the forward end of a hitch link showing the manner in which the link is connected to a ball on the truck.

The link 30 as shown at FIG. 3 is a rigid member such as a tube or any other convenient structural section, a T-beam, H-beam or the like. The swivel connector 31 connecting the forward end of the link with the truck as illustrated at FIG. 4, includes a ball 38 mounted upon a bolt 39 which extends through a hole 40 in the rear bumper 25 of the trailer and is secured thereby as by a nut 41. The link 30 carries an adjustable, spherical socket 42 to fit over the ball 38. The socket 42 includes an elongated hollow pocket 43 extending from one side of the socket to be welded to the link 30. A lock lug 44 is slidably carried within this pocket 43 to be urged into the socket and against the ball 38. This lug is forcibly positioned against the ball by a hand screw 45 fitted onto the arm 43. The swivel connector 31 connecting the rear end of the link with the trailer is identical in construction to the connector at the forward end of the link and it is attached to a ball 38 bolted to the shelf 28 at the leading edge of the trailer.

The ball and socket connector 37 at the forward end of the gooseneck arm 32 is also a swivel-type connector and a socket 42' at the end of the arm 32 is fitted upon a ball 38' upstanding from the floor of the truck bed. This socket 42', best illustrated at FIG. 6, will include a lock lug 44' which is slidably carried in a pocket 43' at the end of the arm 32. A toggle-latch mechanism 45' forceably positions the lug against the ball 38' and thereby secures the socket 42' to ball 38' in a floor connector C.

The floor connector C is formed as a grooved plate 46, having parallel, opposing slots 47. A slide bar 48 is mounted upon this plate within the embrace of the slots 47 to carry the ball 38'. The plate 46 is securely attached to the floor of the bed 23 by bolts 49 with the slots straddling the longitudinal axis of the truck as in the manner illustrated in FIGS. 6 and 7. This arrangement with the bar 48 slidably held in the grooves of plate 46 permits the end of the gooseneck support to shift longitudinally along the longitudinal axis of the truck as the trailer makes a turn, as will now be described.

The manner in which the two links 30 are attached to the trailer T and to the truck V to function according to the principles of the invention is illustrated at FIG. 5. The trailing end of each link 30 is connected to a ball 38 near its side of the trailer so that these rearward connections of the links are spaced apart, symmetrically with respect to the longitudinal axis of the trailer, a distance which may be a substantial portion of the width of the trailer T. The forward end of each link is connected to a ball 38 at the bumper 25. These forward connections of the two links are also spaced apart, symmetrically with respect to the longitudinal axis of the truck but at a distance less than the spacing of the yokes 34 so that the links will converge toward the axis of the truck and in such a manner as to cause the line projections 'p' of the links to meet at point 'a,' which is at the axle of the rear wheels 22 of the truck when the truck and trailer are in alignment on a common longitudinal axis 'x' as shown in solid lines at FIG. 5.

The compound trailer, formed by the two converging links, will cause the trailer to swing about the truck, from a common axial alignment, about a vertical swing axis at the designated point a at the rear axle housing. As heretofore noted, this is an ideal and proper location to place the swing axis of a connection between a vehicle and a trailer. Thus, whenever the truck and trailer are moving along a highway, the ordinary small changes of direction to keep the truck in alignment on the highway will not be magnified at the trailer and the ordinary cause of side sway of a trailer is effectively eliminated.

Whenever the truck turns slightly on a large radius of curvature to correct a small change of direction, the location of the turn axis, point a, will not change significantly. However, whenever the truck makes a sharp turn, the swing axis represented by point a will shift rearwardly from the rear axle housing of the truck and to one side of the longitudinal axis of the truck as to positions indicated in broken lines at FIG. 5. This will cause the gooseneck support arm 32 to slide forwardly as shown. When the truck turns sharply, this shift of the turn axis a does not create any problem and actually, the two link trailer hitch produces a desirable action in a short turn because the trailer will turn on a radius somewhat less than the radius of turn of the vehicle. In ordinary turning movements, however, this difference is not great and for all practical purposes, the trailer will follow the tracks of the truck. This action is especially useful and desirable in situations where the truck must be turned on comparatively narrow roads or turned around sharp corners.

Several variations of construction from the unit shown at FIGS. 1–5 are possible. In each instance, however, the pair of converging links is secured to spaced apart points at the leading end of the trailer and like spaced-apart points at the rear end of the vehicle in a manner such that the projections of the links meet at a point a near the rear axis of the vehicle when the truck and trailer are in alignment and a support arm such as the gooseneck arm 32 will be used to carry part of the load to the trailer.

The embodiment illustrated at FIGS. 8, 9, and 10 shows another mode of connecting a trailer T'' to a vehicle where links 30 having ball type connectors 31 at both the forward and rear ends of the connectors are the same as heretofore described. In this arrangement, a portion of the weight and load of the trailer is transmitted to the truck by an arm 52 extending forwardly from the trailer to overhang the rear of the truck. This arm 52 is reinforced by a strut 53. In this arrangement, the arm must be free to move laterally, forwardly and rearwardly because the axis about which the trailer swings during a turn will change its position with respect to the truck. However, this arm 52 must be restrained by the truck against vertical movement. To satisfy these limitations, a cross bar 54, formed as an inverted U, has its arms 55 pivotally connected to the sides of the truck as in sockets 56. The extended end of the arm 52 is connected by a pivot 57 to a slide 58 which is carried upon the crossbar 54. This slide 58 may be provided with wheels 59 within it to more easily move sidewise along the crossbar 54. It follows that the trailer T will be secured to the truck by the compound hitch and whenever the truck and trailer turns, the arm 52 will swing at the pivot 57 but it is also free to shift sidewise along the crossbar 54. A further freedom of movement is permitted since, should the arm 52 move forwardly or rearwardly with respect to the truck, these movements will be permitted by the U-shaped crossbar rotating at the sockets 56. However, a portion of the trailer load is always transmitted to the truck through arm 52 bearing against the crossbar 54.

FIG. 11 shows a modified arrangement for a supporting arm which is especially suitable for a truck V3 having a rigid cover over its rear portion. A compound trailer hitch H is used which is formed by links 30 having ball connectors 31 at the front and rear ends of each link to interconnect with the vehicle and a trailer T3, the same as described in connection with the FIG. 6 construction. A portion of the weight of the trailer is transmitted to the truck through an arm 50 which outstands from the front of the trailer T3 and which is connected to the trailer by a vertically axised pivot 61 so that this arm may swing horizontally, but not vertically. The extended end of the arm is slidably fitted into a tube 62 whose base is angled to fit into a ball and socket joint 63 mounted upon the top of the truck V3. This ball and socket connection permits the tube 62 to swing horizontally and vertically. Accordingly, when the truck and trailer are turning, the arm 60 will swing horizontally in the pivot 61, the tube 62 will also swing horizontally and the arm 60 will telescope into and out of the arm as the relative positions of the truck and trailer change. Should the truck and trailer pass over a swale, bump or a change of grade, the tubular member will then swing vertically to compensate for that change of alignment and at the same time the arm 60 will telescope into and out of the tube 62. At all times, however, the arm 60 and tube 62 will transmit the unbalanced portion of the trailer load to the vehicle.

FIG. 12 shows yet another modified structure for supporting the unbalanced portion of the weight of the trailer upon a vehicle V4 which is illustrated as being an automobile. The trailer T4 is connected to the automobile V4 by a compound trailer hitch 30 having ball connectors 37 at the front and rear ends of each link to interconnect with the automobile and the trailer T4 in a manner which is essentially the same as heretofore described in connection with the FIG. 6 construction. The unbalanced portion of the trailer weight is transmitted to the automobile through an arm 72 which outstands from the front of the trailer T4. This arm may be reinforced by a strut 73 in a manner similar to the construction at FIG. 8. The outstanding end of this arm 72 is supported by a strut upstanding from the rear portion of the vehicle and this strut is arranged to swing sidewise and forwardly and backwards to yield to the differential movements between the outstanding end of the arm 72 and the rear portion of the vehicle V4. This strut 74 is thus connected to the outstanding end of the arm 72 by a swivel joint 75 while the base end is connected to a swivel joint 76 mounted upon the automobile as upon the rear trunk lid as illustrated. This arrangement is remarkably stable and the trailer will follow the automobile in a smooth, even manner. To further eliminate vibration actions which would tend to lift the outstanding end of the arm 72 away from the vehicle to place arm 74 in tension, a spring 77 may be provided between the automobile and the strut 73 to minimize such undesirable movements.

FIG. 13 shows a further modification of the invention, an articulated gooseneck arm 32a having a forward section 80 and a trailing section 81 joined together at a vertical hinge joint 82 by a pintle 83. The pivot axis of this hinge 82 lies in spaced parallelism with the axis of the mounting pintle 34. This articulated gooseneck arm 32a is mounted upon a trailer T with a pivot bearing tube 33 and a pintle connector 34, the same as heretofore described. Also, it connects to a vehicle in the same manner. The forward end of the arm extends to the bed of the vehicle to be supported upon a ball 38'. In this modified construction the ball 38' is supported upon a plate 48' which is bolted in a grooved plate 46a having slots 47. The plate is attached to the floor of the vehicle bed 23 as heretofore described. However, this plate 46a need not be as long as the plate 46 heretofore described because the extent of the movements of the slide bar will be less.

The trailer is connected to the vehicle by a pair of forwardly converging links 30 in the same manner as heretofore described but such links are not shown at FIG. 13. When in use, the arm 32a will flex at the hinge joint 82 as well as flexing at the mounting pivot, at pintle 34. Preferably, this hinge joint 82 is located near the point of alignment between the two ball and socket connections 31 at the forward ends of the legs 30 directly over the rear bumper 25 of the vehicle. A spring 84 may be provided at each side of the forward section 80 to bear against the trailing section, and thus hold the articulated sections of the gooseneck arm in alignment whenever the vehicle and trailer are not turning.

FIGS. 14 and 15 illustrate a preferred use of this articulated gooseneck connector 32a, for it is especially useful where a trailer T is to be connected to a vehicle V, such as a pickup truck carrying a camper K over the bed 23. Since the camper will extend over the floor of the pickup truck bed 23, it is necessary to extend the gooseneck connector arm into the camper K. This may be accomplished by using the articulated gooseneck arm 32a and extending the forward section 80 through a central, vertical slot 85 in the lower portion of the camper door 86 at the rear of the camper. The door may have a removable section 86a at one side of the slot to facilitate opening it. The forward section 80 of this articulated gooseneck arm 32a will be mounted upon the bed of the truck as heretofore described. A pair of simple springs 84a may be attached to the opposite sides of this forward section 80 to bear against the sides of the opening 85 to hold the forward section at the longitudinal center of the truck, insofar as possible.

After the articulated gooseneck arm 32a and the hitch arms 30 connect the trailer T to the vehicle V, as heretofore described and as illustrated at FIGS. 14 – 16, the vehicle may tow the trailer in a smooth sway-free manner as described. Whenever the vehicle and trailer are in alignment, as when the vehicle is moving along a straight path, the hinge joint 82 is preferably over the rear bumper 25 of the vehicle V directly between the forward ball and socket connectors 31 of the arms 30 as at the position shown in broken lines at FIG. 16. When so moving along a straight path, changes in grade will cause the forward end of the connector arm 32a to shift back and forth in the slide plate 46a.

A small amount of shifting of the forward section 80 of the connector arm will also occur whenever the vehicle is turning. FIG. 16 illustrates the position the articulated arm 32a will assume during a sharp turn when the trailer shifts from the straight alignment position shown in broken lines to the position shown in solid lines. It is to be noted that whenever the springs 84a hold the forward section in longitudinal alignment, or nearly so as illustrated, the trailing section of the gooseneck will swing and the hinge pivot 82 will shift forwardly a short distance, forcing the ball connector 38' to shift in the slide plate 46 a.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. A compound trailer hitch for interconnecting the trailing end of a vehicle having its trailing end spaced rearwardly of the rear axle to the leading end of a two-wheel type trailer having its wheels rearwardly of its center of gravity whereby to normally place part of the trailer weight upon the vehicle, which includes in combination:
   a. a hitching means comprising:
      i. a pair of hitch links, each having a swivel connection means at its front end and rear end;
      ii. a swivel connector at each side of the trailing end of the vehicle, with each swivel connector connecting with the front end swivel connection means of a hitch link and
      iii. a swivel connector at each side of the leading end of the trailer, with each swivel connector connecting with the rear end swivel connection means of a hitch link;
      wherein the swivel connectors on the trailer and on the vehicle are arranged such that the spacing between the trailer swivel connectors is greater than the spacing between the vehicle swivel connectors whereby the hitch links are spaced apart and converge forwardly with the forward projections of the converging links meeting at a point near the vehicle axle whenever the vehicle and trailer are in alignment; and
   b. a load supporting means comprising:
      i. a cantilever arm outstanding from the leading end of the trailer and extending forwardly of the trailing end of the vehicle;
      ii. a connective means on the vehicle to engage the cantilever arm to receive loads imposed onto the vehicle from the trailer through the arm and
      iii. a shifting means associated with the arm and the connective means to effect a continuous flexible engagement of the cantilever arm and the connective means as the relative positions of the vehicle and trailer change, as when turning.

2. In the combination defined in claim 1, wherein the shifting means includes:
   a. a vertical-axised pivot on the cantilever arm adjacent to the trailer to permit the arm to swing laterally; and
   b. a slide means at the connective means on the vehicle to permit the slide means to shift longitudinally with respect to the vehicle.

3. The combination defined in claim 2, wherein:
the cantilever arm extends above the rear end of the vehicle as a gooseneck connector and includes a socket at its extended end; and
the connective means includes a ball to receive the aforesaid socket.

4. The combination defined in claim 3, wherein the vehicle includes:
a flat bed above the rear axle and the connective means, the ball, is positioned approximately above the rear axle whenever the vehicle and trailer are in alignment.

5. The combination defined in claim 3, including:
a second, vertical-axised pivot on the cantilever arm at a position intermediate to the trailer and vehicle connections whereby to permit the swinging arc of the forward end of the arm to be restrained compared with the swinging arc of the rear end of the arm when the vehicle and trailer are turning.

6. The combination defined in claim 3, wherein the vehicle includes:
a flat bed; and
the connector-slide means is a way mounted longitudinally upon the vehicle to support the aforesaid ball.

7. The combination defined in claim 1, wherein:
the connective means is a strut means upstanding from the vehicle to engage the cantilever arm.

8. In the combination defined in claim 6 wherein the strut means includes:
a bent in the form of an inverted U having a transverse horizontal arm over the rear portion of the vehicle and vertical arms pivotally connected to the opposite sides of the vehicle to permit the horizontal arm to swing forwardly and rearwardly above the vehicle; and
the shifting means includes a pivot-slide connector at the outstanding end of the cantilever arm connecting with the horizontal arm of the bent to permit the same to slide along the horizontal arm and to pivot thereabout as the relative positions of the vehicle and trailer change when turning.

9. In the organization defined in claim 6 wherein the shifting means includes:
a vertically axised pivot at the base of the cantilever arm, at the trailer, adapted to permit the cantilever arm to swing in a horizontal plane when the trailer is at a horizontal position, and
the strut means includes a tube pivoted to the body of the vehicle to telescopically receive the extended end of the cantilever arm and to pivot with respect to the vehicle in conformance with the movements of the cantilever arm.

10. In the organization defined in claim 6, wherein said strut comprises:
a post upstanding from the body of the vehicle connecting with the cantilever arm and the shifting means includes:
a ball socket joint at each end of the strut, connecting one end of the strut to the vehicle and the other end to the cantilever arm.

11. The combination defined in claim 5, wherein:
The aforesaid second vertically axised pivot on the cantilever arm is essentially in transverse alignment with the swivel connectors at the trailing end of the vehicle.

* * * * *